Patented Dec. 25, 1945

2,391,830

UNITED STATES PATENT OFFICE 2,391,830

REACTION PRODUCTS OF HYDROXYLATED POLYAMINES, HIGHER MOLECULAR WEIGHT CARBOXYLIC ACIDS, AND ORGANIC SULPHONIC ACIDS

David W. Jayne, Jr., Old Greenwich, and Harold M. Day, Cos Cob, Conn., assignors to American Cyanamid Company, New York, N. Y., a corporation of Maine No Drawing. Application November 29, 1941, Serial No. 421,106

9 Claims. (Cl. 260—401)

This invention relates to the production of a new class of chemical compounds and more particularly relates to the reaction products of hydroxylated aliphatic polyamines, higher molecular weight carboxylic acids, and aromatic sulphonic acids.

This application is in part a continuation of our copending application Serial No. 325,394, filed March 22, 1940, now United States Patent No. 2,305,083.

It is an advantage of the present invention that a new class of cation active compounds are provided which have a wide field of usefulness in the commercial art.

Another advantage of the present invention is that a process of producing the above compounds is provided which is easily carried out and uniformly results in excellent yields.

Many further advantages will be come apparent to those skilled in the art from the detailed description following hereafter.

In general we have found that the compounds of the invention may be prepared by two methods. The invention, however, should not be limited to these two particular methods, and it is contemplated that equivalent products produced by other methods would come within the scope of the invention. The two general methods which we have found satisfactory for preparing our new compounds, briefly outlined, are as follows:

A. By heating an organic sulphonic acid salt of a hydroxylated aliphatic polyamine and a higher molecular weight carboxylic acid at a temperature sufficiently high to cause a condensation to take place with the elimination of water.

B. The second method which may be employed for producing the reagents comprises heating a mixture of an aromatic sulphonic acid, hydroxylated aliphatic polyamine, and a higher molecular weight carboxylic acid at a temperature sufficiently high enough to cause a condensation reaction to take place with the elimination of water.

The condensation products produced by either one of the above methods are identical in their physical and chemical properties and are compounds which come within the scope of the present invention.

The hydroxylated aliphatic polyamines which can be used in the production of the compounds of the present invention are aliphatic amino compounds containing a plurality of amino groups and at least one hydroxyl group. They may be represented by the following general formula:

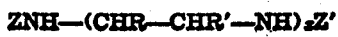

wherein R and R′=H, alkyl or alkylol, Z and Z′=H, alkyl or alkylol, when R and R′ are H or alkyl either Z or Z′ must be an alkylol group, and $x$ is a small whole number.

It is readily seen that there are a large number of compounds included within the scope of the foregoing formula and which may be employed in the preparation of compounds of the present invention. Suitable hydroxylated aliphatic polyamines include those such as:

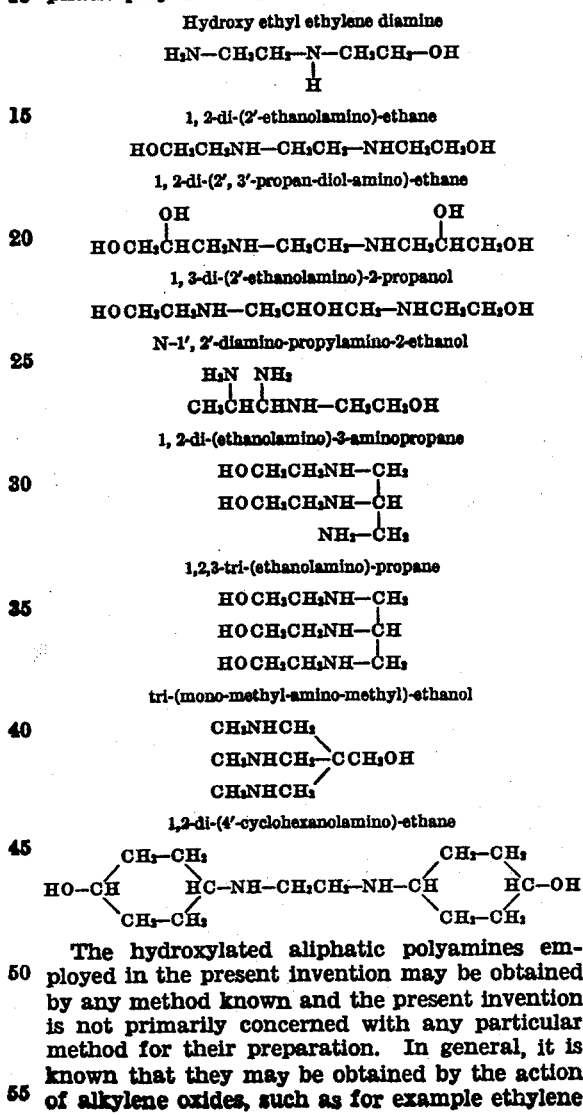

The hydroxylated aliphatic polyamines employed in the present invention may be obtained by any method known and the present invention is not primarily concerned with any particular method for their preparation. In general, it is known that they may be obtained by the action of alkylene oxides, such as for example ethylene oxide, upon an aliphatic diamine, such as for example ethylene diamine.

The compounds produced in accordance with the present invention may be either amides or esters of organic sulphonic acid salts of hydroxylated aliphatic polyamines or ester/amides of such salts. We do not therefore desire to limit the present invention by any positive designation as to their character and will therefore refer to them as condensation products.

The term "hydroxylated aliphatic polyamines" refers to alkylolamine compounds which contain at least two amino groups capable of reacting with acids (i. e., either primary or secondary amino groups), and at least one hydroxy group. When such alkylolamines are condensed in accordance with our invention the products obtained may be represented by either one or a mixture of those such as follows. When an alkylolamine such as hydroxyethyl ethylene diamine, benzene sulphonic acid, and oleic acid are used we may obtain:

(1) 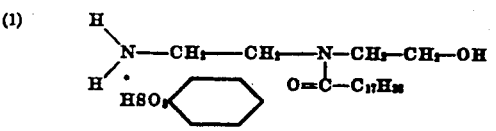

or (2) 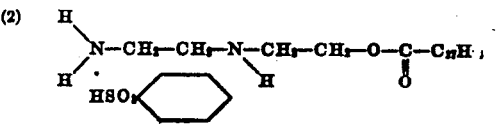

or (3) 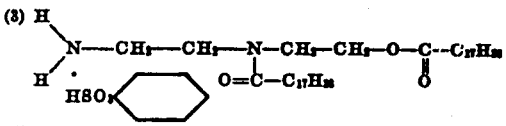

or (4) 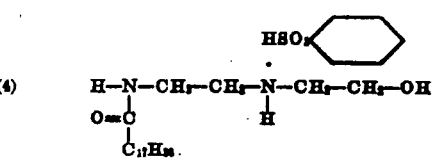

or (5) 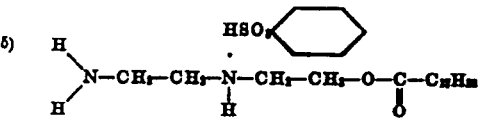

or (6) 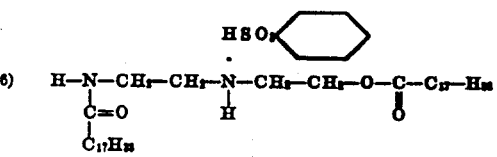

and with a compound such as 1,2-di-(2'-ethanolamino)-ethane containing both a plurality of amino groups and hydroxy groups similar variations may result in the compounds obtained. Regardless of whether the condensation products are esters, amides or ester/amides they have similar properties and are generally useful for the purposes set forth in the specification.

It is readily seen therefore that the acyl radical of oleic acid in the general formulae may be replaced by acyl radicals from various carboxylic acids. Carboxylic acids generally may be employed, including monocarboxylic and polycarboxylic acids. The higher molecular weight organic monocarboxylic acids are usually preferred. Higher molecular weight monocarboxylic acids, straight-chain and branched-chain, aliphatic, and fatty acids, saturated and unsaturated, may be employed, representative ones being those such as caprylic acid, caproic acid, capric acid, sebacic acid, behenic acid, arachidic acid, cerotic acid, erucic acid, melissic acid, stearic acid, oleic acid, ricinoleic acid, linoleic acid, linolenic acid, lauric acid, myristic acid, palmitic acid, mixtures of any two or more of the above-mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil, partially or completely hydrogenated animal and vegetable oils such as those mentioned; hydroxy and alpha-hydroxy higher aliphatic and fatty acids such as 1-hydroxy stearic acid, dihydroxy stearic acid, alpha-hydroxy stearic acid, alpha-hydroxy palmitic acid, alpha-hydroxy lauric acid, alpha-hydroxy coconut oil mixed fatty acids, and the like; fatty acids derived from various waxes such as beeswax, spermaceti, etc. Similarly we may use carboxylic acids derived, by oxidation and other methods, from petroleum, cycloaliphatic and hydroaromatic acids such as hexahydrobenzoic acid, resinic acids, napthenic acid and abietic acid; aromatic acids such as phthalic acid, benzoic acid, naphthoic acid, pyridine carboxylic acids; hydroxy aromatic acids such as salicylic acid, hydroxy benzoic and naphthoic acids, and the like.

The invention will be more fully described in conjunction with the following specific examples. It should be understood, however, that these examples are only the preferred methods for producing representative compounds, and the invention is not to be limited to the details set forth therein.

EXAMPLE 1

*Reaction product of hydroxyethyl ethylene diamine, benzene sulphonic acid, and oleic acid*

A mixture of 52 grams (0.5 mol) of hydroxyethyl ethylene diamine, 79 grams (0.5 mol) of anhydrous benzene sulphonic acid and 141 grams (0.5 mol) of oleic acid was heated to 250° C. then cooled to room temperature. The product was a dark brown paste completely soluble in water to give a clear solution which foamed readily.

EXAMPLE 2

*Reaction product of hydroxyethyl ethylenediamine, p-toluene sulphonic acid and coconut oil fatty acids*

A mixture of 52 grams (0.5 mol) of hydroxyethyl ethylene diamine, 95 grams (0.5 mol) p-toluene sulphonic acid monohydrate and 107.5 grams (0.5 mol) of coconut oil fatty acids was heated to 200° C. then cooled to room temperature. The product was a clear amber-colored, viscous syrup completely soluble in water to give a clear solution which foamed readily.

EXAMPLE 3

*Reaction product of hydroxyethyl ethylenediamine, p-toluene sulphonic acid and coconut oil fatty acids*

A mixture of 26 grams (0.25 mol) of hydroxyethyl ethylene diamine, 47.5 grams (0.25 mol) of p-toluene sulphonic acid monohydrate and 107.5 grams (0.5 mol) of coconut oil fatty acids was heated to 230° C. then cooled to room temperature. The product was an amber-colored paste soluble in water to give a solution which foamed readily.

EXAMPLE 4

*Reaction product of hydroxyethyl ethylenediamine, p-toluene sulphonic acid and myristic acid*

A mixture of 52 grams (0.5 mol) of hydroxyethyl ethylene diamine and 95 grams (0.5 mol) p-toluene sulphonic acid monohydrate was heated to 180° C. The resulting sulphonic acid salt of the amine was cooled to 150° C. and 113 grams (0.5 mol) of technical myristic acid added to it. This mixture was heated to 230° C. then cooled to room temperature. The product was a thin, amber-colored paste completely soluble in water to give a clear solution which foamed readily.

EXAMPLE 5

*Reaction product of hydroxyethyl ethylenediamine, p-toluene sulphonic acid and stearic acid*

A mixture of 52 grams (0.5 mol) of hydroxyethyl ethylene diamine, 95 grams (0.5 mol) of p-toluene sulphonic acid monohydrate and 142 grams (0.5 mol) of stearic acid was heated to 200° C. then cooled to room temperature. The product was a thick, dark amber-colored paste completely soluble in water to give a clear solution which foamed readily.

EXAMPLE 6

*Reaction product of hydroxyethyl ethylenediamine, p-toluene sulphonic acid and naphthenic acid*

A mixture of 26 grams (0.25 mol) of hydroxyethyl ethylene diamine, 47.5 grams (0.25 mol) of p-toluene sulphonic acid monohydrate and 62.5 grams (0.25 mol) of naphthenic acid (acid value 221) was heated to 235° C. then cooled to room temperature. The product was a thick, dark amber-colored paste soluble in water to give a solution which foamed readily.

EXAMPLE 7

*Reaction product of hydroxyethyl ethylenediamine, p-toluene sulphonic acid and talloel*

A mixture of 26 grams (0.25 mol) of hydroxyethyl ethylene diamine, 47.5 grams (0.25 mol) of p-toluene sulphonic acid monohydrate and 84.5 grams (0.25 mol) of talloel (acid value 166) was heated to 235° C. then cooled to room temperature. The product was a thick, dark-colored paste soluble in water to give a solution which foamed readily.

EXAMPLE 8

*Reaction product of hydroxyethyl ethylenediamine, beta-naphthalene sulphonic acid and coconut oil fatty acids*

A mixture of 26 grams (0.25 mol) of hydroxyethyl ethylene diamine, 57 grams (0.25 mol) beta-naphthalene sulphonic acid monohydrate and 54 grams (0.25 mol) coconut oil fatty acid was heated to 225° C. then cooled to room temperature. The product was a thick, yellow paste soluble in water to give a solution which foamed readily.

Other higher molecular weight carboxylic acids which may be used in place of all or part of the fatty acid in the above examples, are capric, palmitic, stearic, abietic, montanic, naphthenic acids, talloel acids, mixtures of such acids and especially mixtures of acids obtainable by saponification from palm kernel oil, cottonseed oil, or from any of the various other vegetable or animal oils and fats, or any of the acids mentioned heretofore in the specification.

Likewise, various other organic sulphonic acid salts of hydroxylated aliphatic polyamines or mixtures of the sulphonic acid and polyamines, may be used in place of all or part of the sulphonic acid salts and acid-polyamine mixtures employed in the above examples, and the invention is not limited to those of a particular series. Thus, for example, in addition to the common aromatic sulphonic acids of the benzene series employed in the examples, those of diphenyl, naphthalene, anthracene and phenanthrene series may be used. The aliphatic sulphonic acids may likewise be employed such as those of paraffin hydrocarbons of 12 to 18 carbon atoms in length, lignin sulphonic acid, guanyl urea sulphonic acid, dodecyl sulphonic acid, and the like, also compounds such as toluene thiosulphonic acid.

The preferred compounds produced in accordance with our invention are those produced by the condensation of higher fatty acids with hydroxyethyl ethylenediamine and an aromatic sulphonic acid. The preferred higher fatty acids employed are those having at least 12 carbon atoms. In carrying out the reaction, the temperatures may be varied somewhat, the preferred range being from about 150° to about 350° C. In producing the compounds the ratio of the reactants may be varied within certain limits. The ratio of hydroxyethyl ethylenediamine to the sulphonic acid is usually 1:1 and the ratio of the hydroxyethyl ethylenediamine to fatty acids may be 1:1 or 1:2.

The various arts in which the compounds of the invention may be used commercially are widely diversified. In general, however, these compounds may be employed for the following uses among others:

1. Wetting or surface tension reducing agents.
2. Detergents.
3. Emulsifiers or dispersing agents.
4. Demulsifiers.
5. Lubricants.
6. Dye assistants.
7. Ore dressing.
8. As aids in chemical reactions.

We claim:

1. A process of producing chemical compounds which comprises heating a higher fatty acid at temperatures of from about 150 to 350° C. with a mixture of a hydroxylated aliphatic polyamine and at least a sufficient amount of an aromatic sulphonic acid to form an equivalent salt.

2. A process according to claim 1 in which the mol ratio of hydroxylated aliphatic polyamine to organic sulphonic acid is from about 1:1 to 1:2.

3. A process according to claim 1 in which the hydroxylated aliphatic polyamine is hydroxyethyl ethylene diamine.

4. Condensation products selected from the group consisting of the higher fatty acid amides and ester-amides of organic sulphonic acid salts of hydroxylated aliphatic polyamines.

5. Condensation products according to claim 4 in which the fatty acid is oleic acid.

6. Condensation products according to claim 4 in which the fatty acid is cocoanut oil fatty acid.

7. Condensation products according to claim 4 in which the aromatic sulphonic acid is benzene sulphonic acid and the fatty acid is oleic acid.

8. Condensation products according to claim 4 in which the aromatic sulphonic acid is para-toluene sulphonic acid and the fatty acid is oleic acid.

9. Condensation products according to claim 4 in which the aromatic sulphonic acid is para-toluene sulphonic acid and the fatty acid is cocoanut oil fatty acid.

DAVID W. JAYNE, Jr.
HAROLD M. DAY.